United States Patent
Kanevsky et al.

(10) Patent No.: US 6,675,130 B2
(45) Date of Patent: Jan. 6, 2004

(54) SYSTEM AND METHOD OF USING A PLURALITY OF SENSORS FOR DETERMINING AN INDIVIDUAL'S LEVEL OF PRODUCTIVITY

(75) Inventors: Dimitri Kanevsky, Ossining, NY (US); Wlodek W. Zadrozny, Tarrytown, NY (US)

(73) Assignee: IBM Corporation, Armonk, NY (US)

( * ) Notice: Subject to any disclaimer, the term of this patent is extended or adjusted under 35 U.S.C. 154(b) by 208 days.

(21) Appl. No.: 09/742,916

(22) Filed: Dec. 21, 2000

(65) Prior Publication Data

US 2002/0082809 A1 Jun. 27, 2002

(51) Int. Cl.$^7$ .............................................. G06F 15/00
(52) U.S. Cl. .................................................. 702/188
(58) Field of Search ............................. 702/188, 150, 702/182, 94, 183, 152, 153, 95; 340/524, 539.23, 686.6

(56) References Cited

U.S. PATENT DOCUMENTS

| | | | |
|---|---|---|---|
| 5,107,855 A | * 4/1992 | Harrington et al. | 600/534 |
| 5,375,610 A | * 12/1994 | LaCourse et al. | 128/782 |
| 5,570,301 A | * 10/1996 | Barrus | 364/559 |
| 5,963,891 A | * 10/1999 | Walker et al. | 702/150 |
| 6,148,280 A | * 11/2000 | Kramer | 702/153 |
| 6,421,453 B1 | * 7/2002 | Kanevsky et al. | 382/115 |

* cited by examiner

*Primary Examiner*—Michael Nghiem
(74) *Attorney, Agent, or Firm*—Dilworth & Barrese, LLP (57) ABSTRACT

A system is provided having a plurality of sensors for affixing to a person's torso, hands, feet, head, etc. The function of each sensor is to determine the distance between itself and the other sensors to ascertain the distance between the hands and feet, for instance, in order to measure the relative activity of a person's hands and feet. Other sensors, placed on the individual or in the individual's environment, may obtain biological data relating to the person, such as heart pulse, blood pressure, or data relating to the individual's attention level, i.e., gaze data. The system further includes a processor having a memory for storing data collected from the sensors. The data collected by the sensors and stored in the memory provide at least information about different types of movements associated with a particular set of tasks. The processor is programmed with a set of instructions to relate the movements associated with work with different levels of productivity, and even different levels of performing work, e.g., whether the work is being performed carefully or not, i.e., whether the same movements for a given task vary from slow to quick or whether they have a constant pace. The processor is preferably in a remote location and obtains the sensed data via a network. The system is also capable of analyzing sensed data obtained from different individuals, providing feedback to the individuals regarding their level of productivity, either alone or as a group, and offering advice on improving their level of productivity.

23 Claims, 5 Drawing Sheets

FIG. 1

| NAME AND OTHER INFORMATION 200 | | | | |
|---|---|---|---|---|
| Type of Movements 204 | Type of Tasks 212 | Type of Work Environment 214 | Interactions With Other Individuals 220 | Index 202 |
| Body Part 206 | | Interruptions 216 | | Productivity Level Correlated With The Interruptions 222 |
| Correlations of The Different Body Parts 208 | | Productivity Level Correlated With The Types of Movement 218 | | Biological Data 226 |
| Type of Activity 210 | | | | Productivity Level Correlated With The Biological Data 228 |

SYSTEM AND METHOD OF USING A PLURALITY OF SENSORS FOR DETERMINING AN INDIVIDUAL'S LEVEL OF PRODUCTIVITY

FIELD OF THE INVENTION

The invention is related to the field of determining and improving productivity of individuals, and specifically, to a system and method of using a plurality of sensors for determining and improving an individual's level of productivity, as well as productivity of a group of individuals.

BACKGROUND OF THE INVENTION

Level of productivity among individuals tends to vary. Employers often evaluate an employee's productivity, especially an employee performing manual and/or repetitive tasks, by videotaping the employee and/or by hiring independent monitoring groups. Such monitoring actions do not necessarily provide reliable results in quantifying the employee's level of productivity, since these monitoring actions only provide a snapshot of a few minutes to a few hours of the employee's work progress, and typically do not apply to professionals.

Professional employees are typically evaluated by their output, e.g., number of patients seen, number of sales in the last quarter, and quality level of a published publication. The evaluation of their output is a feedback mechanism on the macro level, i.e., after a task is completed. There are no unobtrusive feedback mechanisms that might help a professional better manage their time and tasks on a micro level, i.e., during the execution of a task.

In general, individuals benefit from better managing their time and tasks, even household chores. A group of employees and a group of individuals, e.g., a family, also benefit from better managing their time and tasks.

It has been greatly reported in the literature that in order to provide statistically significant results of an employee's level of productivity, the employee's amount of participation and involvement in performing his assigned tasks must be monitored objectively and over a long period of time. One reason for this is that studies have concluded that certain individuals with particular biological rhythms find it easier to work in the early hours, while other individuals having different biological rhythms find it easier to work in the afternoon, or even in the evening. Typically, when the employee's level of productivity is determined by monitoring the employee, these factors, among others, are not taken into consideration.

Accordingly, there exists a need for a system and method for determining the productivity of individuals which overcome the disadvantages of prior art systems and methods and provide a reliable, accurate and statistically significant determination of a particular individual's level of productivity. Also, there exists a need for a system and method for providing a group of individuals with feedback on its level of productivity.

SUMMARY

An aspect of the present invention is provide a system and method for determining the level of productivity of individuals which overcome the disadvantages of prior art systems and methods.

Another aspect of the present invention is to provide a system and method for determining the level of productivity of individuals using a plurality of sensors.

Yet another aspect of the present invention is to provide a system and method for determining the level of productivity of a group of individuals using a plurality of sensors.

Accordingly, in an embodiment of the present invention, a system is presented having a plurality of sensors for affixing to a person's torso, hands, feet, head, etc. The function of each sensor is to determine the distance between itself and the other sensors to ascertain the distance between the hands and feet, for instance, in order to measure the relative activity of a person's hands and feet. Other sensors may obtain biological data relating to the person, such as heart pulse, blood pressure, etc. The sensors are designed to function non-intrusively and to be non-intrusively placed on the person's body. The system further includes a processor having a memory for storing data collected from the sensors.

The data collected by the sensors and stored in the memory provide information about different types of movements, also referred as activity signatures, which are associated and not associated with work, e.g., a particular set of tasks. The processor is programmed with a set of instructions of various application processes to relate the movements associated with work with different levels of productivity, and even different levels of performing work, e.g., whether the work is being performed carefully or not, i.e., whether the same movements for a given task vary from slow to quick or whether they have a constant pace. The processor is preferably in a remote location and obtains the sensor data via a network.

With the system and method of the present invention, if a person is performing a task, it is possible to determine how productive the person is in performing the task. For example, if the person is writing, the system analyzes the motion of the hand holding the pen, the movement of the arm muscles, and the frequency of movement of the hand holding the pen with respect to the other hand, i.e., the system analyzes various activity signatures related to writing, as determined by the sensors on the body. The data can then be used to determine whether the person was able to think and write quickly or considerably pause and think before writing.

Also, as indicated above, with the system and method of the present invention, one can determine how one is performing their work. For example, in the case of a surgeon performing surgery, the system can determine whether the surgery is being performed slowly or quickly, or some pace in between, and whether the surgeon is tense or relaxed. The data can then be compared with data obtained from other surgeons; for example, a surgeon who is considered to be a great surgeon in performing the same surgery. The comparison can determine whether the surgeon is up to par or even better than the surgeon considered to be a great surgeon. Also, the data obtained by the present system can be used to relate how various events, e.g., the door being opened to one's office, the absence of one or more co-workers, the ringing of the telephone system, the visiting of other people, etc., affects productivity.

Further, with the system and method of the present invention, the sensors are also capable of communicating with sensors located on other people, e.g., co-workers, for determining a level of interaction between a particular individual and other individuals. The system of the present invention can also be linked to wireless devices, such as laptop computers, cellular telephones, and personal digital assistants, in order for a supervisor or manager to have instant access to one's productivity and to the overall productivity of a facility or just the level of productivity in completing a particular task, such as installing an engine in an automobile.

Additionally, by analyzing the sensed data from a group of individuals, it is possible to determine a productivity level of the group, offer performance feedback and even improve the level of productivity by suitably tuning communication tools. For instance, telephone calls can be forwarded to a voice mail system and e-mail can be delayed if an individual in the group is determined by the system of the present invention to be concentrating on an important task (the task can be gleaned from analyzing the individual's gaze and the content appearing on the individual's computer display, and the task's importance or priority can be determined by analyzing the individual's computer data and degree of concentration from the sensed data).

It is envisioned that based on the results yielded by analyzing the movements and biological data of productive workers and nonproductive workers using the system of the present invention, it is possible to generalize work-habits necessary for improving productivity. For example, the data obtained and analyzed by the system of the present invention may indicate that productive workers are working shorter shifts, that nonproductive workers are talking for long periods of time on the telephone, etc. Therefore, to increase the productivity level of the nonproductive workers, management may decide to instruct (by following a system advice) these workers not too talk on the telephone for more than one-half hour a day, and go home earlier.

Conventional sensors and their associated sensor systems can be utilized by the system of the present invention, such as sensors which when placed on a person's body can be located by capturing the image of the sensors on film and radio transmitters which emit signals capable of being detected by radio receivers. Other sensors, such as gaze sensing devices, can be placed in the environment.

DETAILED DESCRIPTION OF THE INVENTION

Figure 1:
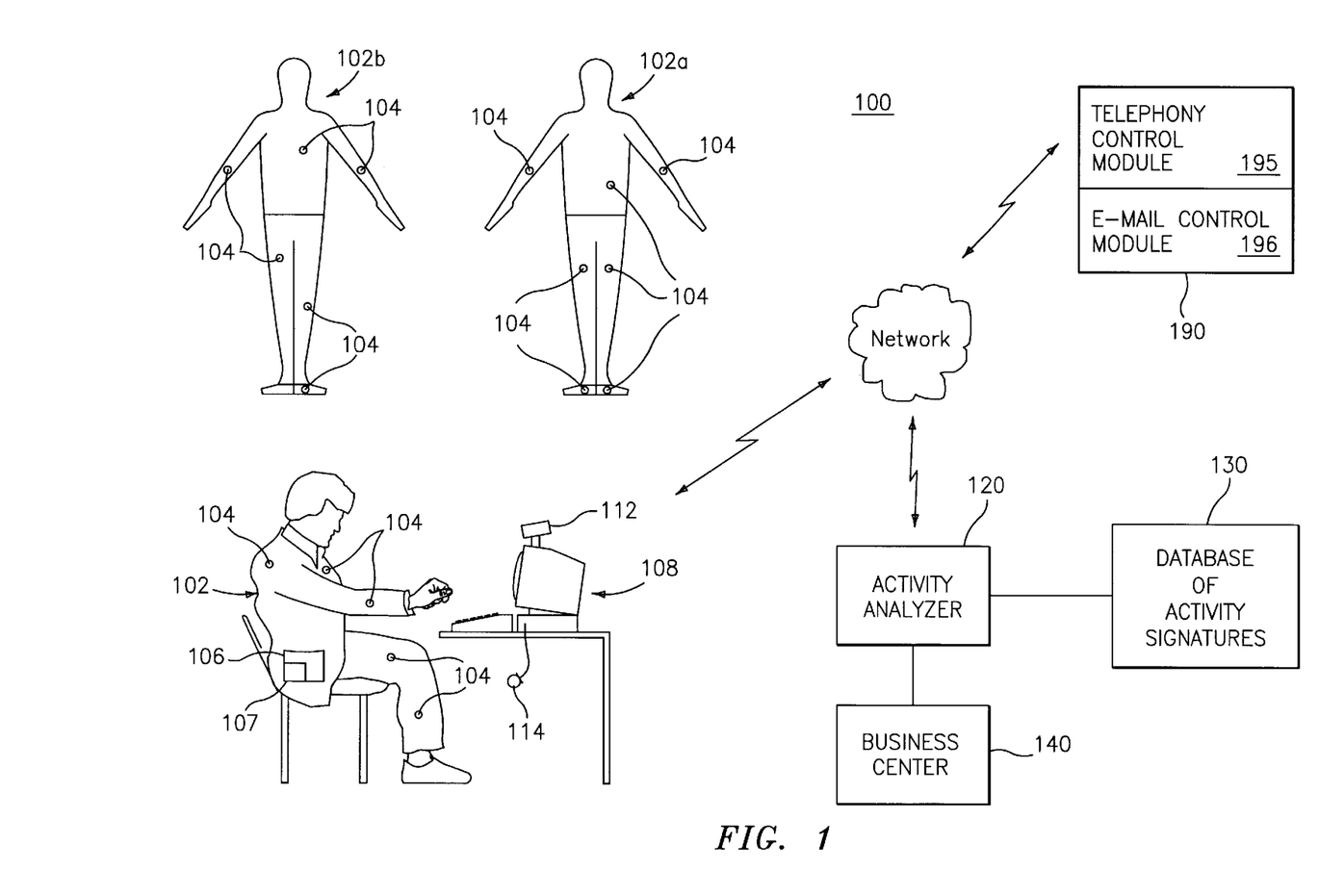
FIG. 1 illustrates an individual mounted with a plurality of sensors and a block diagram of hardware for determining the individual's level of productivity, providing feedback and adjusting operation of an enterprise system according to the principles of the present invention.

FIG. 1 illustrates an individual and a block diagram of a system using a plurality of sensors for determining the individual's level of productivity according to the principles of the present invention. The system and individual are designated generally by reference numerals 100 and 102, respectively. The plurality of sensors are mounted on the individual 102 and are designated generally by reference numeral 104. The plurality of sensors 104 transmit signals which are received by a wireless router or other device and are routed through a network 110, such as the Internet and/or Intranet, as known in the art.

The plurality of sensors 104 are preferably mounted on the individual's torso, head, arms, hands, and feet and sense relative distance measurements between each other. The sensors 104 may also sense other data, such as biological data, e.g., heart pulse and blood pressure, while the individual 102 is working. The sensed data is transmitted via the network 110 to an activity analyzer 120 which uses the sensed data for determining at least the individual's level of productivity using a plurality of application processes as further described below. The activity analyzer 120 is preferably a remote server capable of receiving the data from the sensors 104 via the network 110. It is contemplated that the activity analyzer 120 includes software and/or hardware for remotely controlling the sensors 104, e.g., turning on/off particular sensors 104, obtaining data from only a select group of sensors 104, and obtaining data related to only a certain characteristic, such as the relative distance between each sensor 104.

The system 100 can be configured such that the data is not routed through the network 110 and that it is only transmitted from the sensors 104 and recorded within at least a wireless computing device 106, such as a badge or personal digital assistant (PDA), having a transceiver 107 and a processor, and/or within a local personal computer 108. The processor of the computing device 106 and the personal computer 108 are programmed with a set of instructions for analyzing the data and determining a level of productivity of the individual and other data as described below, such as a level of interaction between the individual and other individuals. The data can be analyzed in real-time or in the future. The wireless computing device 106 can be programmed with a network interface program, e.g., a web browser, in order for the transceiver 107 to wirelessly transmit the received and/or analyzed data via the network 110 to the activity analyzer 120 and/or enterprise system 190 which is described below for processing of the data. It is contemplated that the wireless computing device 106 may be equipped with an interface for directly connecting the device 106 to a network routing device, such as a PC, router, etc., for transmitting and receiving data from an external processing device, such as the activity analyzer 120, via the network 110.

The analysis performed by the wireless computing device 106 or the personal computer 108 can be used by the individual or a group of individuals to adjust work habits and other work-related characteristics, e.g., switch to a different project, to increase or decrease their level of productivity. A camera 112, such as a web-cam, or a gaze tracker, and a microphone 114 are preferably connected to the personal computer 108 to provide audiovisual information to the activity analyzer 120 or other remote server via the network 110.

As illustrated by FIG. 1, other individuals 102a–102b in the work environment have sensors 104 mounted on them. It is provided that each sensor 104 in the work environment emits a unique identification signal such that data routing equipment connected to the network 110, the wireless computing device 106, the personal computer 108, and the other sensors 104 can determine from which sensor 104 a particular signal received was transmitted from. This allows the system 100 to determine the relative movement of each sensor 104 with respect to other sensors 104 for analyzing at least the productivity level of each individual and the interaction between individuals.

It is contemplated that the signals emitted from the sensors 104 are also unique with respect to the individual's title or hierarchy within the work environment. Accordingly, the system of the present invention can determine a level of interaction between individuals having different titles or between a supervisor and his supervised employees. Further, the system 100 can determine how the level of interaction affects one's productivity level. For example, the system 100 can determine if an individual's productivity level decreases as a particular individual enters his vicinity or work area.

Further still, the system of the present invention can also determine the biological responses of the supervisor and the supervised employees as they communicate, in order to better understand and analyze the level of communication between the individuals. The analysis could help determine the role that the level of communication plays in the productivity level of the work environment. The analysis could also determine if a particular supervisor is oppressive and if a particular supervised employee is non-cooperative.

With continued reference to FIG. 1, the system 100 further includes a database of activity signatures 130 accessible by the activity analyzer 120. The system 100 also includes a business center 140 for aiding in implementing within a company's work environment a method of analyzing the level of productivity of at least one individual, according to the present invention, from a remote location, such as the location of the activity analyzer 120.

The business center 140 includes processing circuitry for providing requested productivity analysis and other types of analysis conducted by the activity analyzer 120 to the company on a regular or intermittent basis for a fee. It is contemplated that the business center 140 includes a database of productivity improvement suggestions mapped to respective levels of productivity. Based on the level of productivity determined for a particular individual or a work environment, the processing circuitry of the business center 140 maps the level of productivity to at least one productivity improvement suggestion. The suggestion is then routed electronically through the network 110 to the individual or a designated company employee, such as a manager or an officer.

The enterprise system 190 is connected to the individual's computer 108 and telephone (not shown) via the network 110. The enterprise system 190 contains telephony control 195 and e-mail control 196 modules which can operate based on the correlations and analysis provided by the activity analyzer 120 and/or business center 140. In a preferred implementation of the system 100, each of the control modules 195, 196 include a processor having a set of programmable instructions for restricting or reducing the number of telephone calls and/or e-mail messages placed or sent to a specific individual and/or a group of individuals in a period of time to increase the individual's and/or the group's level of productivity.

Figure 2:
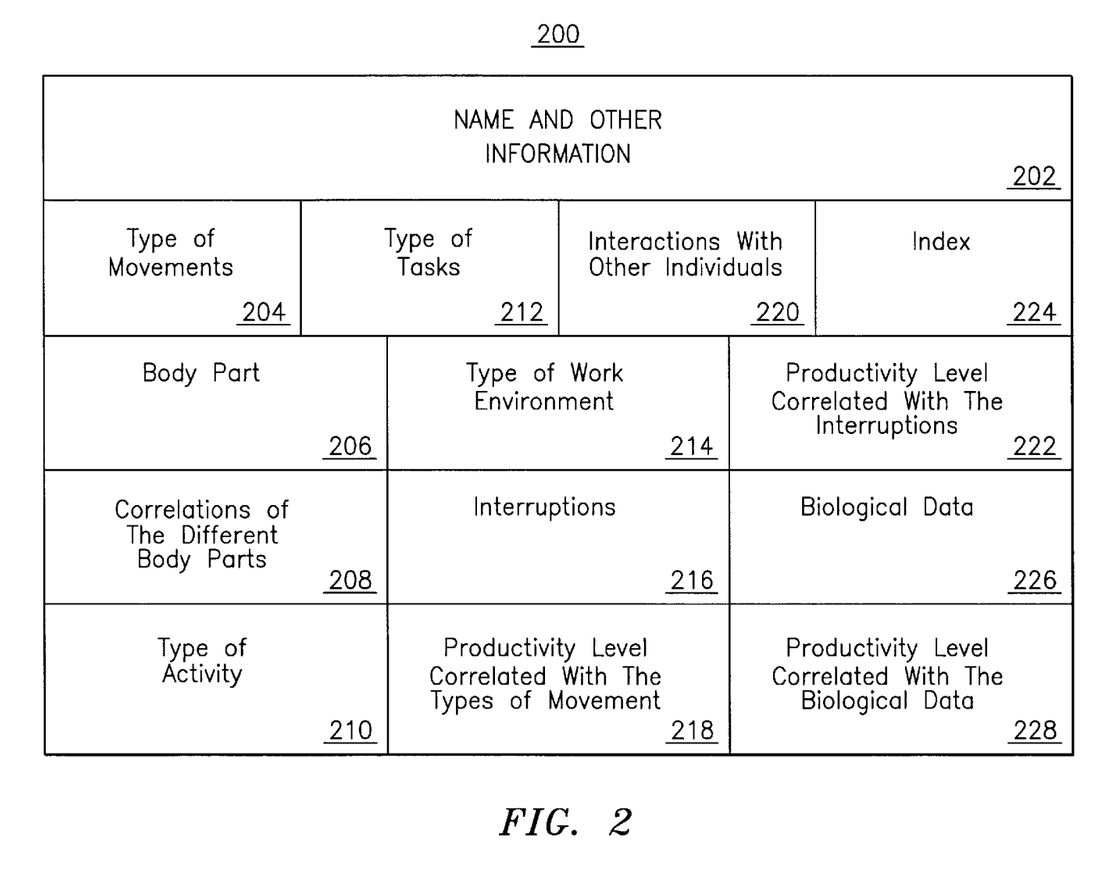
FIG. 2 illustrates an exemplary record having a plurality of fields as stored within a database of the present invention.

FIG. 2 illustrates an exemplary record 200 having a plurality of fields for a particular individual as provided by the database of activity signatures 130. Each record 200 as stored within the database 130 contains a plurality of fields which display information which can change in real-time as information is routed through the network 110 to the activity analyzer 120. The activity analyzer 120 contains a respective application process programmed with a set of instructions for determining the data stored within each of the plurality of fields using the sensor data or other data received via the network.

Each record preferably contains a field 202 for the name and other information related to the individual, such as age, sex, job title, period of time employed by the company, and annual salary and bonuses. Field 204 is also included for providing a description of the type of movements the individual did or is currently doing, such as sitting, standing, writing, curling fingers, and walking. Field 206 indicates the body part(s) that is related with the type of movements indicated by field 204, such as the left hand, right arm, left foot, and lower torso.

Field 208 indicates information relating to correlations of the different parts of the body mounted with sensors 104, such as the relative distance of the arms while the individuals is performing the movement indicated in field 204. Field 210 indicates the type of activity or activities the individual is most probably performing, such as typing, lifting, pushing, and talking, due to the correlations shown in field 208. Field 212 indicates the type of tasks the individual is performing, such as typing a work order, lifting a crate of screws, pushing a cart, and talking to the supervisor. Field 214 indicates the work environment, such as factory, airport terminal, office, and police station, that the tasks are being performed in by the individual.

Field 216 indicates any interruptions, such as telephone range, the individual's office door was opened or closed, a fire alarm rang, and the lights turned off, which occur or have occurred while the individual is or was performing the tasks indicated by field 212. Field 218 indicates the level of productivity as it is correlated with the type of movements indicated by field 204. Field 220 indicates information relating to any interactions between the individuals and other individuals within the work environment. Field 222 indicates correlations between the individual's level of productivity and the interruptions indicated by field 216.

Field 224 provides an index for determining whether the various correlations and other data provided by the record 200 are significant, e.g., statistically significant, with respect to affecting the individual's level of productivity or level of productivity of the group to which the individual belongs. For example, whether the correlations provided by field 218 are significantly attributable to the individual's level of productivity. Field 226 indicates biological activity signatures or data, such as the individual's heart pulse, and blood pressure, while performing the movements indicated by field 204. Field 228 indicates any correlations between the individual's biological data as indicated by field 226 with the individual's level of productivity.

Figure 3:
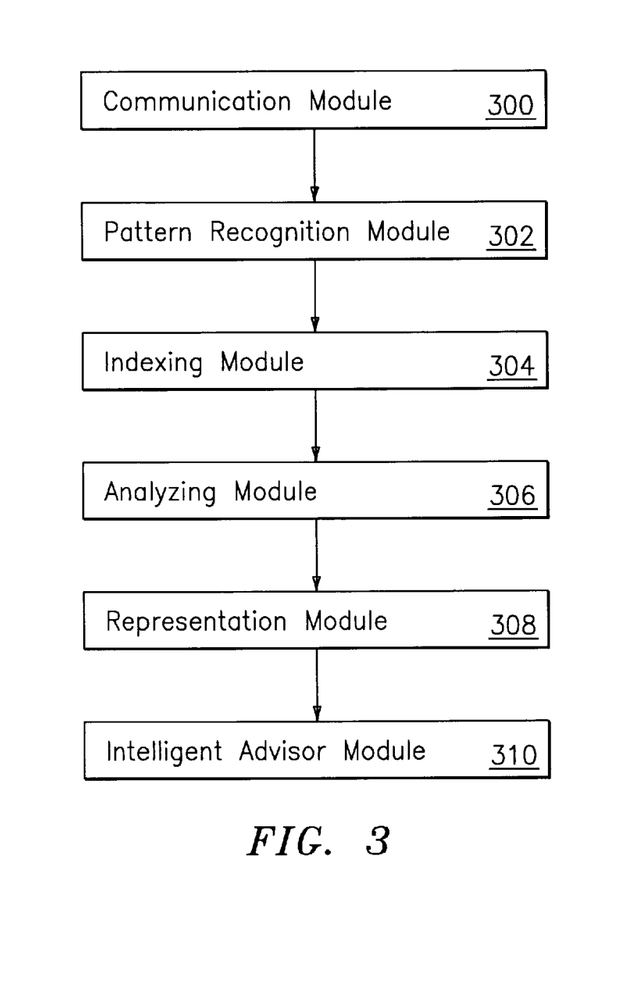
FIG. 3 is a block diagram of an activity analyzer as shown by FIG. 1.

With reference to FIG. 3, there is shown a block diagram of an exemplary embodiment of the activity analyzer 120 having several modules. Each module preferably includes hardware and/or a set of programmable instructions executed by a processor within the activity analyzer 120 for achieving the prescribed function of the module. The activity analyzer 120 includes a communication module 300 having a modem or other communication hardware as known in the art for communicating with the plurality of sensors 104 and other equipment via the network 110. The communication module 300 also communicates with the database of activity signatures 130 and the business center 140.

A pattern recognition module 302 is included which determines using pattern recognition techniques known in the art whether they are any patterns within the received data. For example, whether two types of movements, such as moving one's head up and down as that person types to look at the monitor and then at the keyboard, affect the individual's level of productivity. The pattern recognition module 302 also determines the type of activity being performed and inputs that information into field 210 of the database 130. The type of tasks being performed by the individual or a group of individuals can also be determined by the pattern recognition module 302 and inputted into field 212. It is contemplated that the type of tasks being performed can be inputted manually within field 212 by the individual via an Internet connection apparatus. For example, the user can access a web site corresponding to the activity analyzer 120 and then access the database 130 via the activity analyzer 120 to enter data within the database 130. It is also contemplated that other type of data, such as the type of work environment and the interaction among the various individuals, can be determined by the pattern recognition module 302 and be provided within the database of activity signatures 130.

Preferably, the pattern recognition module 302 utilized in the system is embodied using the apparatus and methodology described in U.S. patent application Ser. No. 09/079,754 filed on May 15, 1998; the contents of which are incorporated herein by reference. It is contemplated that the pattern recognition module 302 includes means for receiving multimedia data, as well as biological signals masking biological activity signatures.

The indexing module 304 generates a real-time index of all the data generated by the pattern recognition module 302 and/or received by the communication module 300. For example, with the aid of the index, one can type "left hand" into a web site corresponding to the activity analyzer 120 or using a keyboard of the business center 140 and be provided with all the left-hand movements. One can also type an interaction, such as phone ringing, and be provided with data dealing with that interaction from the database 130. For example, data obtained from fields 216 and/or 222 of the database 130.

The analyzing module 306 analyzes data received by the activity analyzer 120 and generates data related to individuals' productivity levels and other data. Data generated by the analyzing module 306 is transmitted to a representation module 308. The representation module 308 displays the data on a display or other display means for allowing one to study the data to determine what movements or activity signatures are closely related or affecting one's level of productivity. For example, if one's level of productivity decreases as a result of certain activity signatures, including biological activity signatures, the representation module 308 will display these activity signatures or other factors, such as interruptions and type of work environment, in an understandable and comprehensive format.

Intelligent advisor module 310 provides recommendations and other information on the basis of data that is generated by the various modules and data that is received by the communication module 300. A person can review the recommendations and other information provided by the intelligent advisor module 310 and appropriately reconfigure the factors affecting their own productivity level or someone else's productivity level. For example, the advisor can use the data provided by the intelligent advisor module 310 to recommend to a manager not to interrupt an employee at a certain time. The data from module 310 can also be used by an individual to refrain from pushing a cart with the left foot, because that action causes the individual to become tired quicker than if the individual pushed the cart with both hands. Intelligent advisor 310 can also send data with suggestions to the enterprise system 190, and control modules 195, 196.

Figure 4:
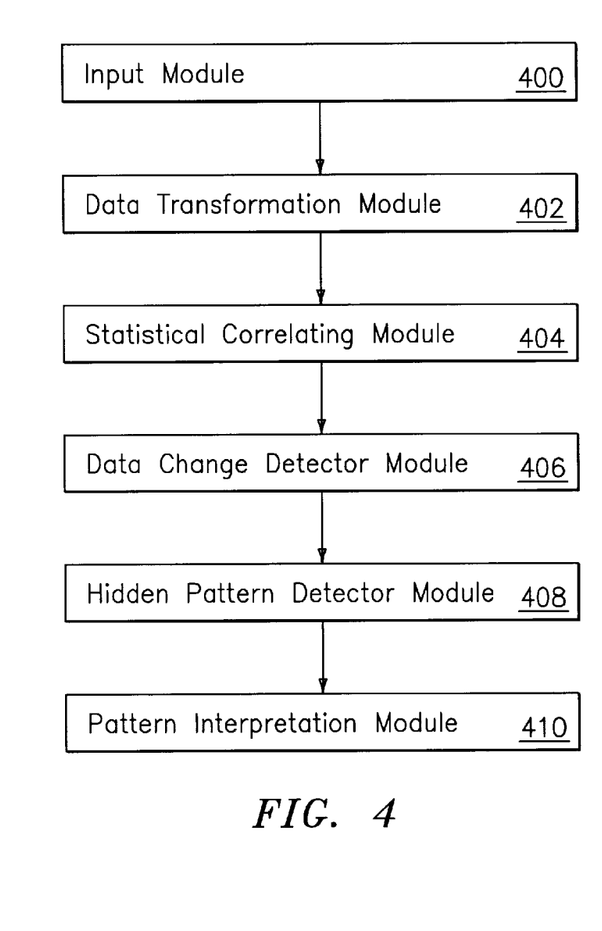
FIG. 4 is a block diagram of an analyzing module of the activity analyzer.

With reference to FIG. 4, there is shown a block diagram of the analyzing module 306 of the activity analyzer 120. The analyzing module 306 includes an input module 400 for receiving data of different formats. The data is routed to a data transformation module 402 where it is transformed or converted to a mathematical format, e.g., mathematical vectors, or other format. After the data is transformed by the data transformation module 402, the data can be statistically correlated by a statistical correlating module 404 using statistical methodology. The statistically correlated data from the statistical correlating module 404 is routed to a data change detector module 406. The data change detector module 406 detects changes in the data due to an individual having the sensors 104 mounted thereon changing movements or switching tasks.

Accordingly, the function of the data change detector module 406 is to detect the onset of significant changes in the sensed data. The detection of changes in the sensed data is important in statistically processing the data. After changes in the sensed data are detected by the data change detector module 406, statistical methods are applied to interpret and analyze the new sensed data stream.

A hidden pattern detector module 408 detects patterns in the data that are not easily discernible by one studying the data. The hidden pattern detector module 408 uses methodologies known in the art for detecting patterns in the data. A pattern interpretation module 410 interprets patterns identified in the data and provides a user with statements, such as the level of productivity of the individual has increased or that interruptions by a particular individual causes the level of productivity of another individual to decrease.

Figure 5:
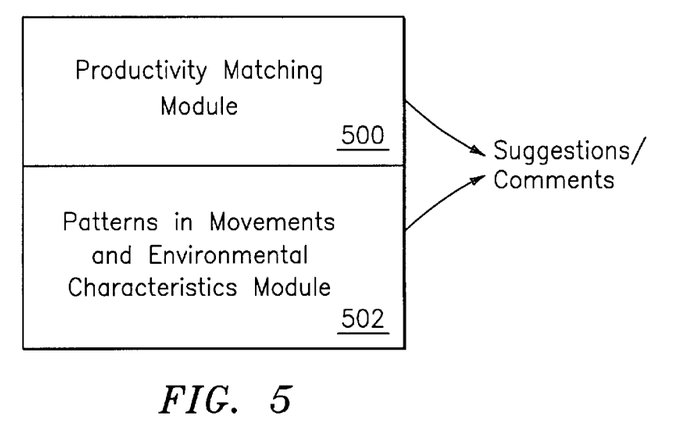
FIG. 5 is a block diagram of an intelligent advisor module of the activity analyzer.

FIG. 5 is a block diagram of the intelligent advisor module 310 of the activity analyzer 120. A productivity matching module 500 matches pre-stored levels of productivity with the accumulated data. That is, the data is compared to the pre-stored levels of productivity until at least one level of productivity is determined which closely matches the data. The module 500 then provides suggestions and/or comments based on the determined at least one level of productivity.

Another module 502 provides data relating to patterns in movements and environmental characteristics of the individual's environment. If the intelligent advisor module 310 determines that the level of productivity increases when certain patterns in movements and environmental characteristics are present, then the module 310 provides suggestions and/or comments indicating that these movements and environmental characteristics increase the level of productivity. The opposite is true, when the level of productivity decreases. That is the module 310 provides suggestions and/or comments to eliminate the movements and environmental characteristics contributing to the decrease in the level of productivity.

Figure 6A:
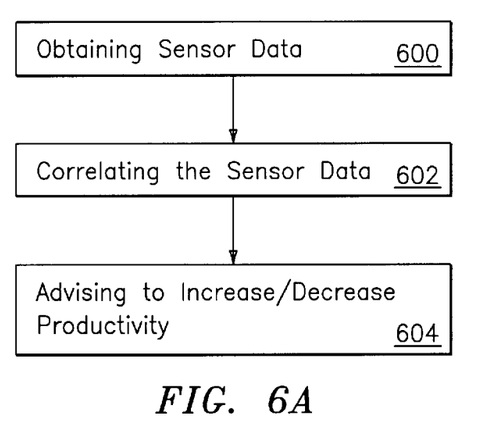
FIG. 6A is a flowchart of an exemplary method according to the principles of the present invention.

With reference to FIG. 6A, there is shown a flowchart of an exemplary method according to the principles of the present invention. Step 600 obtains data from the sensors mounted on an individual. Step 602 correlates the sensor data with data regarding the level of productivity and the work environment of the individual stored within the activity analyzer 120, the database 130 or other storage medium. This step is further described with reference to FIG. 6B below. Step 604 advises about changing or keeping the various factors, such as types of movements, interruptions, and types of activities, which affect the level of productivity of the individual to increase or decrease the level of productivity.

Figure 6B:
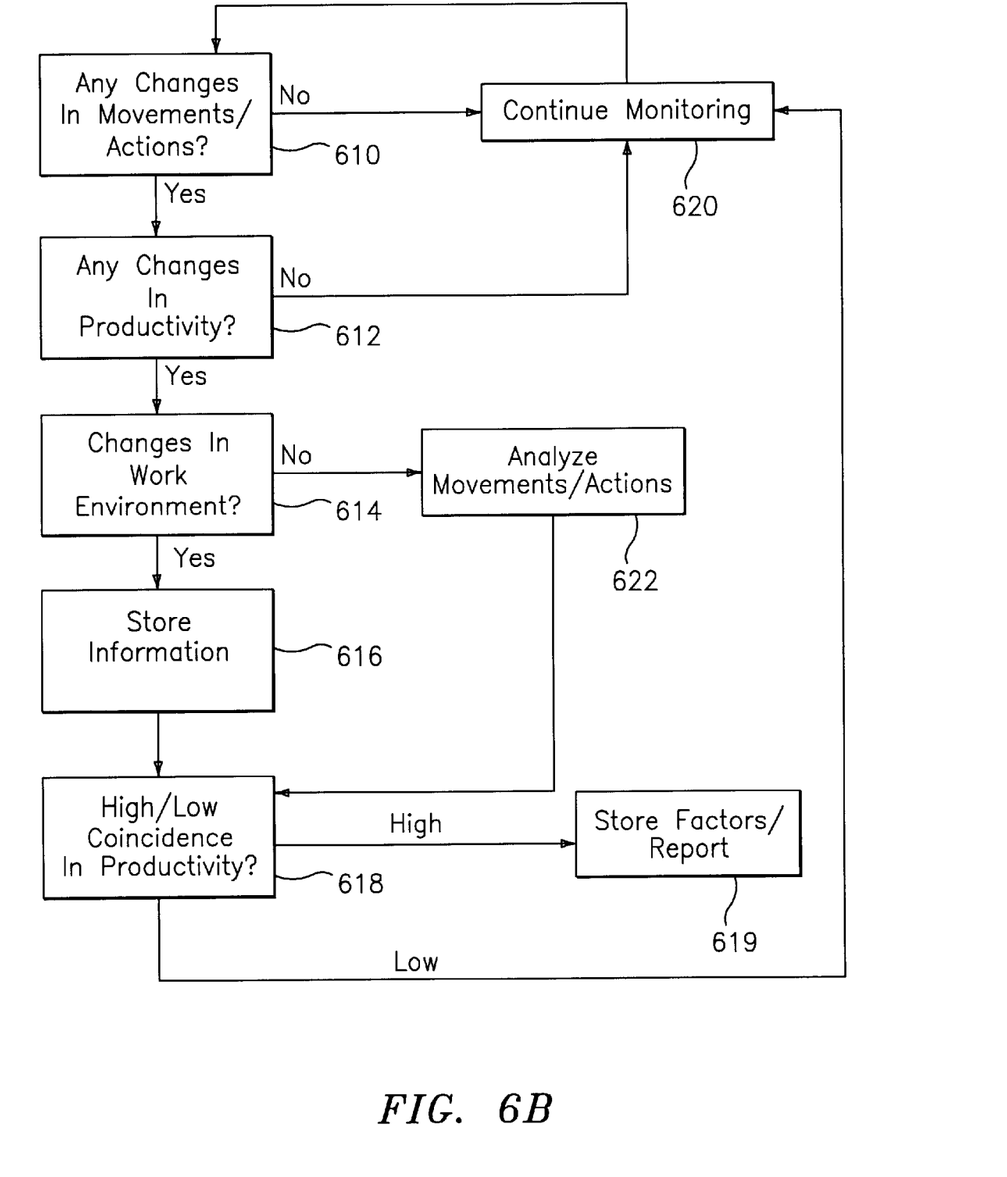
FIG. 6B is a detailed flowchart of a method step illustrated by FIG. 6A.

FIG. 6B provides a detailed flowchart of the correlating step 602 of FIG. 6A. Step 610 determines whether there are any changes in an individual's movements or actions, e.g., the individual changes his typing speed. If yes, then step 612 verifies whether there is any change in the individual's level of productivity, e.g., a decrease in the amount of computer code typed during the last thirty minutes than a previous thirty minutes. If yes, then step 614 verifies whether there were any changes in the individual's work environment, e.g., a telephone rang.

If yes, then step 616 stores the information determined in steps 612 and 614, e.g., there was a decrease in the amount of computer code typed during the last thirty minutes and the telephone rang. Step 618 determines whether there is a high or low level of coincidence in the individual's level of productivity taken in conjunction with the movements, work environment, etc. If such coincidence is high, then the factors, e.g., movements, work environment, etc., are stored and/or reported with advice on how to improve the individual's level of productivity at step 619. If low, the process proceeds to step 620 to continue monitoring the data obtained from the sensors.

If there are no changes in the individual's movements or actions and no changes in the work environment as determined in steps 610, 612, then the process proceeds to step 620 and continues to monitor the data obtained from the sensors. This data is analyzed and the process returns to step 610. If step 612 determines there is a change in the individual's level of productivity but there is no change in the work environment, then the process proceeds to step 622 where the movements or actions which led to the change in the individual's level of productivity are analyzed, classified and stored. The process then proceeds to step 618.

Figure 7:
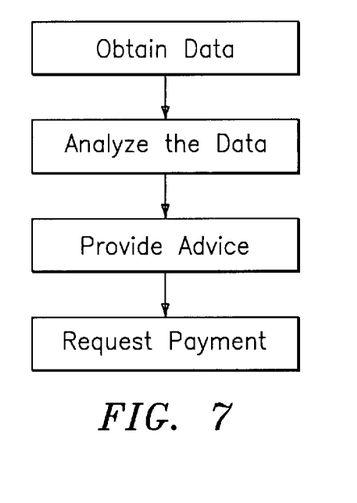
FIG. 7 is a flowchart of an exemplary method of doing business according to the principles of the present invention.

With reference to FIG. 7, a flowchart of an exemplary method of doing business according to the principles of the present invention is shown. The method is performed by programming a processor of the business center 140 with a set of programmable instructions to perform the method steps of FIG. 7. Step 700 communicates with the activity analyzer 120 to obtain sensor data corresponding to a particular facility or company. Step 702 analyzes the data in a similar method as described above with respect to the analyzing module 306. Step 704 provides advice based on the analysis to at least one individual affiliated with the particular facility or company. Step 706 bills the facility or company for providing the service, i.e., analyzing the sensor data and providing advice.

What has been described herein is merely illustrative of the application of the principles of the present invention. For example, the functions described above and implemented as the best mode for operating the present invention are for illustration purposes only. As a particular example, for instance, other design configurations may be used for obtaining and analyzing sensor data to determine one's level of productivity. Also, the invention may be used for other purposes besides determining one's level of productivity, such as comparing the work performance or level of productivity of two or more individual's, e.g., comparing the work performance of a novice surgeon with an experienced surgeon. Accordingly, other arrangements and methods may be implemented by those skilled in the art without departing from the scope and spirit of this invention.

We claim:

1. A system for determining at least a level of productivity of at least one individual, said system comprising:
   a plurality of sensors mounted on said at least one individual for sensing distance measurements between at least each of said plurality of sensors, each of said plurality of sensors being capable of transmitting the distance measurements to a remote location;
   a network for routing the distance measurements to the remote location; and
   a server at said remote location having an application process programmed therein for analyzing the distance measurements to determine at least said level of productivity of said at least one individual, the server enabled to determine a factor affecting said level of productivity and control the factor to improve said level of productivity.

2. The system according to claim 1, further comprising a database accessible by said server for storing data and obtaining data to and from said database.

3. The system according to claim 2, wherein said database includes a plurality of records each having a plurality of data fields.

4. The system according to claim 1, wherein said server further includes an application process for analyzing the distance measurements to determine at least a level of interaction between said at least one individual and other individuals.

5. The system according to claim 1, wherein said server further includes an application process for analyzing the distance measurements to determine at least one type of activity being performed by said at least one individual.

6. The system according to claim 5, wherein said server further includes at least one application process for determining and analyzing correlations between the at least one type of activity being performed by said at least one individual and said level of productivity.

7. The system according to claim 6, wherein said server comprises means for transmitting analyzed correlations to at least one processor being programmed with a set of programmable instructions for performing at least one action to affect said level of productivity of said at least one individual.

8. The system according to claim 7, wherein said at least one action is one of controlling a telephone and an e-mail system of said at least one individual.

9. The system according to claim 1, further comprising a business center connected to said server for analyzing the distance measurements, providing advice based on the analysis, and requesting payment for the advice.

10. The system according to claim 1, further comprising a module for providing environmental data of at least one work environment corresponding to said at least one individual, said environmental data for being analyzed by said server to determine at least said level of productivity of said at least one individual.

11. A method for determining at least a level of productivity of at least one individual, said method comprising the steps of:
   sensing distance measurements between at least each of a plurality of sensors mounted on said at least one individual, each of said plurality of sensors being capable of transmitting the distance measurements to a processing unit;
   transmitting the distance measurements to the processing unit; and
   analyzing the distance measurements by the processing unit for determining at least said level of productivity of said at least one individual;
   determining a factor affecting said level of productivity; and controlling the factor to improve said level of productivity.

12. The method according to claim 11, further comprising the step of analyzing the distance measurements for determining at least a level of interaction between said at least one individual and other individuals.

13. The method according to claim 11, further comprising the step of analyzing the distance measurements for determining at least one type of activity being performed by said at least one individual.

14. The method according to claim 11, further comprising the step of performing at least one action to affect said level of productivity of said at least one individual.

15. The method according to claim 11, further comprising the steps of:

provide environmental data of at least one work environment corresponding to said at least one individual;

transmitting the environmental data to said processing unit; and analyzing the environmental data by the processing unit for determining at least said level of productivity of said at least one individual.

16. The method according to claim 11, further comprising the step of providing advice based on the analysis.

17. The method according to claim 16, further comprising the step of requesting payment for the advice.

18. A device for determining at least a level of productivity of at least one individual, said device comprising:

a transceiver for receiving distance measurements between at least each of a plurality of sensors mounted on said at least one individual, each of said plurality of sensors being capable of transmitting the distance measurements to the transceiver; and a processor having a set of programmable instructions for analyzing the distance measurements to determine at least said level of productivity of said at least one individual and enabled to determine a factor affecting said level of productivity and control the factor to improve said level of productivity.

19. The device according to claim 18, wherein said processor further analyzes the distance measurements to determine at least a level of interaction between said at least one individual and other individuals.

20. The device according to claim 18, wherein said processor further analyzes the distance measurements to determine at least one type of activity being performed by said at least one individual.

21. The device according to claim 18, wherein said processor further analyzes the distance measurements to determine correlations between said level of productivity and interruptions which interrupted said at least one individual, different types of movements of said at least one individual, and biological data of said at least one individual.

22. The device according to claim 18, wherein said processor further receives data related to work environment of said at least one individual and said processor having another set of programmable instructions for analyzing the data to determine at least said level of productivity of said at least one individual.

23. The device according to claim 18, wherein said transceiver is configured for transmitting data to an external processing device.

* * * * *